United States Patent

Sivaram et al.

[11] Patent Number: 5,962,360
[45] Date of Patent: Oct. 5, 1999

[54] PROCESS FOR THE PREPARATION OF A MAGNESIUM HALIDE SUPPORTED METALLOCENE CATALYST

[75] Inventors: Swaminathan Sivaram, Pune; Soumen Sensarma, Barasat, both of India

[73] Assignee: Council of Scientific and Industrial Research, New Delhi, India

[21] Appl. No.: 08/856,191

[22] Filed: May 14, 1997

[30] Foreign Application Priority Data

Mar. 27, 1997 [IN] India ............................. 795/97

[51] Int. Cl.$^6$ ............ B01J 31/00; B01J 37/00; C08F 4/02; C08F 4/60
[52] U.S. Cl. ............ 502/107; 502/104; 502/115; 502/121; 502/122; 502/123; 502/124; 502/125; 502/126; 502/127; 502/134; 526/124.2; 526/160
[58] Field of Search ............ 502/104, 107, 502/121, 122, 123, 124, 125, 126, 127, 115, 134

[56] References Cited

U.S. PATENT DOCUMENTS

| 4,659,685 | 4/1987 | Coleman, III et al. ............ 502/113 |
| 5,106,804 | 4/1992 | Bailly et al. ............ 502/104 |

FOREIGN PATENT DOCUMENTS

| 0 435 514 | 7/1991 | European Pat. Off. . |
| 0436326A1 | 7/1991 | European Pat. Off. . |
| 0 576 213 | 12/1993 | European Pat. Off. . |
| 0 619 326 | 10/1994 | European Pat. Off. . |
| 4-275311 | 9/1992 | Japan . |
| 5-51411 | 3/1993 | Japan . |
| 5-125112 | 5/1993 | Japan . |
| 5-186524 | 7/1993 | Japan . |
| 5-320237 | 12/1993 | Japan . |

OTHER PUBLICATIONS

European Patent Office database "esp@cenet", Abstract of JP 4275311, published Sep. 30, 1992, Idemitsu Petrochem Cp. Ltd.

Primary Examiner—Mark L. Bell
Assistant Examiner—J. Pasterczyk
Attorney, Agent, or Firm—Birch, Stewart, Kolasch & Birch, LLP

[57] ABSTRACT

The present invention is directed to a process for the preparation of a solid magnesium halide supported metallocene catalyst having a transition metal selected from the group consisting of IIIB, IVB, VB and VIB of the periodic table, which comprises preparing a slurry of magnesium metal in an electron donor solvent; heating the slurry of magnesium metal to 0° C. to 50° C. for a period of 10 minutes to 4 hr.; adding a dihaloalkane compound to said slurry to obtain a homogeneous solution of a support (solution A); separately preparing a solution of a metallocene compound in the same electron donor solvent as solution A (solution B); heating the solution B to 0° C. to 50° C. for a period ranging between 10 minutes and 1 hr., adding solution B to solution A over a period ranging between 10 minutes to 2 hrs. while maintaining the temperature in the range of 0 to 50° C. to obtain a homogeneous solution; cooling the resultant homogeneous solution to room temperature under an inert atmosphere; pouring the reaction mixture into a liquid hydrocarbon medium in which all the components will be partly or completely insoluble to precipitate the solid catalyst; separating the solid catalyst precipitated, washing the solid catalyst with a hydrocarbon solvent; and drying the solid catalyst under vacuum at a temperature ranging between 0 to 50° C.

33 Claims, No Drawings

PROCESS FOR THE PREPARATION OF A MAGNESIUM HALIDE SUPPORTED METALLOCENE CATALYST

FIELD OF THE INVENTION

This invention relates to a process for the preparation of a magnesium halide supported metallocene catalyst. More particularly, it relates to a process for the preparation of the said catalyst which is supported on magnesium chloride obtained by exploiting the solubility of magnesium chloride into tetrahydrofuran. The catalyst prepared by the process of the present invention is capable of olefin polymerization and copolymerization, giving olefin polymers and copolymers with high catalyst activity and capable of being used at high temperatures without any loss of activity.

BACKGROUND OF THE INVENTION

Metallocene based catalyst systems which have been developed recently allow unprecedented control on polyolefin structures through catalyst design and have enabled the synthesis of entirely new families of homo and copolymers. Olefin polymerization catalysts comprising a metallocene and aluminum alkyl component are well known in the prior art. The molecular weight of the polymer product can be controlled by adjusting the reaction temperature or the amount of cocatalyst or by the addition of hydrogen. These catalysts require use of aluminoxane or cocatalyst, which is produced by reacting an aluminum alkyl with water. Such reaction is very rapid and highly exothermic. Processes for the production of olefins are known with the help of a homogeneous catalyst system consisting of a transition metal component metallocene, and a cocatalyst component of an oligomeric aluminum compound o aluminoxane (usually methylaluminoxane, herein after referred to as MAO), which lead to the higher activity with narrow molecular weight distribution polymers or copolymers.

Furthermore, U.S. Pat. No. 4,659,685, discloses polymerization of olefins with the aid of a solid catalyst comprising a zirconium based metallocene and a cocatalyst consisting of an organoaluminum compound, especially, MAO. However, this catalyst is preferably used in an aromatic hydrocarbon. It is not suited to heterogeneous processes of polymerization in suspension or in a gaseous phase.

The principle disadvantages of these soluble homogeneous metallocene-MAO catalyst systems are the need for a large excess of MAO, (Al/Metal>$10^5$) for obtaining reasonable polymerization activities, and poor control of polymer morphologies. Furthermore, when used in e.g. a gas or slurry process, there is a tendency for reactor fouling by forming deposits of the polymer on the surface or the walls of the reactor and stirrer. These deposits result in the agglomeration of the polymer particles when the metallocene and aluminoxanes or both, exist in the suspension medium. Such deposits in the reactor system must be removed regularly. Otherwise they prevent adequate heat removal from the reaction, adversely affecting the product quality.

The above disadvantages can be obviated by the use of heterogeneous catalysts, suitable for suspension polymerization in an aliphatic and aromatic hydrocarbon medium, and also in gas phase polymerization processes in which it is important to control the size, particle size distribution, and the morphology of the catalyst particle at the same time. Nevertheless, the catalyst should withstand the growth stresses during the course of gas-phase polymerization. It is also desirable that the solid catalyst be capable of producing an ethylene or an ethylene copolymer with an easily controllable average molecular weight and a narrow molecular weight distribution, which is a useful material for injection moulding.

PRIOR ART REFERENCES

A number of patents e.g. JP 05,125,112; JP 05,51,411; JP 05,320,237; JP 05,186,524 (Mitsui Toatsu Chemicals) describe magnesium chloride supported zirconium based metallocene catalysts used for the polymerization of propylene. A few patents are available in the literature for the polymerization of ethylene using magnesium chloride supported metallocene catalysts. According to Eur. Pat. Appl. No. EP 576, 213 (Mitsubishi Petrochemical Co. Ltd.), polyethylene can be produced with the aid of a solid catalyst comprising of zirconium based metallocene supported on magnesium chloride-2-ethylhexanol. However, the catalyst thus obtained was found to be less active with a relatively broad molecular weight distribution.

JP 04,275,311, (Idemitsu Petrochemical Co.Ltd.) describes another magnesium ethoxide supported metallocene catalyst used for the suspension polymerization of ethylene in n-heptane. However, magnesium alkoxide support depresses polymerization activity.

Eur. Pat. Appl. Nos. EP 435, 514 and EP 436, 326 (BP Chemicals Ltd.) describe solid supported zirconocene catalysts useful for the polymerization of ethylene in suspension and also in gas-phase. The support was prepared by a reaction of di-n-butylmagnesium with a tertiary butyl halide in presence of an ether such as diisoamyl ether with or without an alcohol such as, n-butanol in an aliphatic hydrocarbon medium. These catalysts are prepared by a multi step process involving compounds such as ether/alcohols in the catalyst forming steps. Ethers/alcohols are known to react with organoaluminum compounds and hence, precise control of their proportions is necessary during catalyst preparation. Otherwise, a catalyst with poor or irreproducible properties will be obtained.

SUMMARY OF THE INVENTION

The present invention therefore, relates to a solid catalyst for polymerization and copolymerization of olefins, especially ethylene, the solid catalyst consisting of particles having surface area 10 to 70 m²/g preferably of 15 to 30 m²/g.

The said catalyst comprises a) a support containing from 25 to 50 mol % of magnesium dichloride and from 40 to 80 mol % of at least an electron donor compound (ED), free from labile hydrogen.

b) a transition metal compound of a metal belonging to the group IVB of the Periodic Table containing ligands having a cyclopentadienyl skeleton, the molar ratio of metal/Mg ranging from 0.001 to 0.1.

wherein the transition metal compound is supported on the particulate magnesium based support.

OBJECTS AND DETAILED DESCRIPTION OF THE INVENTION

It is, therefore, an object of the present invention to provide a process for the preparation of a magnesium halide supported metallocene catalyst for olefin polymerization and copolymerization capable of producing high catalyst activity, narrow molecular weight distributions, especially at high temperatures and capable of being used either in gas phase or slurry phase processes.

It is also an object of the present invention to provide a catalyst capable of giving olefin polymers and copolymers with excellent particle characteristics and high yield, especially at high temperature and at a low aluminum to metal ratio.

Another object of the present invention is to simplify the catalyst preparation steps.

Still another object of the present invention is designed to overcome the drawbacks of the prior art and to provide a process for the preparation of the supported metallocene catalyst by furnishing a new solid heterogeneous catalyst system, whose preparation involves a few steps and is a simple one.

Yet another object of the present invention is to provide an improved process for the preparation of a magnesium halide supported metallocene catalyst capable of being employed for the polymerization and copolymerization of olefins especially ethylene, said catalyst comprising atoms of Mg, Cl, an electron donor compound and a neutral metallocene, preferably based on zirconium.

The process comprises,
a) in the first stage, bringing magnesium metal into an electron donor solvent in which the magnesium is completely insoluble,
b) in the second stage, react the magnesium metal with an organo dihalo alkane compound, where the resultant product will be completely soluble into the electron donor,
c) in the third stage, bringing a metallocene compound, preferably zirconium based metallocene compound, into the same electron donor solvent where it will be completely soluble,
d) in the fourth stage, admix the product obtained from the second and third stage, and
e) in the last stage, bringing the product resulting from the fourth stage into an aliphatic hydrocarbon medium where all the components will partially or completely precipitate out.

A neutral metallocene compound having the formula $(Cp)_a(Cp)'_bMX_x$ may be cited as an example wherein X is selected from Cl, Br or I. Examples include mono and dihalide scandium metallocenes such as chlorodi (cyclopentadienyl)scandium; and dichloro(indenyl) scandium, mono, di and trihalides titanium metallocenes, such as chloro- tri(pentamethylcyclopentadienyl)titanium, trichloro(cyclo pentadienyl) titanium, mono, di or trihalides of zirconium such as trichloro(cyclopentadienyl)zirconium, dichloro(biscyclopentadienyl)zirconium metallocene. Among which, the last one is the most preferred.

Accordingly, the present invention provides a process for the preparation of magnesium halide supported metallocene catalyst, which comprises preparing the solution of magnesium halide compound via Grignard decomposition which consists of preparing a slurry of magnesium metal in an electron donor solvent, heating the slurry of magnesium metal to 0° C. to 50° C. for a period of 10 minutes to 4 hr., adding a dihaloalkane compound to this slurry to obtain a homogeneous solution of the support (solution A), separately preparing a solution of metallocene compound into the same electron donor solvent (solution B), heating the solution B to 0° C. to 50° C. for a period ranging between 10 minutes to 1 hr., adding solution B into solution A within a period ranging between 10 minutes to 2 hrs. while keeping the temperature in the range of 0 to 50° C., cooling the resultant homogeneous solution to room temperature under inert atmosphere, pouring the reaction mixture into a liquid hydrocarbon medium in which all the components will be partly or completely insoluble to precipitate the catalyst, separating the solid catalyst thus precipitated by conventional methods, washing the solid catalyst by a hydrocarbon solvent, drying the solid under vacuum at a temperature ranging between 0 to 50° C. to obtain the product.

In an embodiment of the present invention, the magnesium halide used may be selected from chloride, bromide or iodide of magnesium, preferably magnesium chloride.

In another embodiment of the present invention, the electron donor compound may be a generally known Lewis base, exemplified by ethers, thioethers, esters, sulphones, sulphoxides, secondary amides, tertiary amines, tertiary phosphines, and phosphoramides, or Electron donor compounds of low complexing power such as cyclic and non-cyclo ethers or alkyl esters of aliphatic and aromatic carboxylic acids, aliphatic ethers, cyclic ethers and aliphatic ketones. Among the electron donor compounds, the preferable ones are alkyl esters of $C_1$ to $C_4$ saturated aliphatic carboxylic acids; alkyl esters of $C_7$ to $C_8$ aromatic carboxylic acids; $C_2$ to $C_6$ and preferably, $C_3$ to $C_4$ aliphatic ethers; $C_3$ to $C_4$ cyclic ethers and preferably $C_4$ mono or di ether, preferably those which would include methyl formate, ethyl acetate, butyl acetate, hexyl ether, tetrahydrofuran, dioxane etc. The electron donor compound should be an organic compound which is liquid at 25° C. and in which the metallocene and the magnesium dichloride compound formed during the course of reaction are partially or completely soluble.

The dihaloalkanes compound may be a dihalo substituted alkane where the dihalo compound may be chosen from dichloro substituted methane, ethane, propane or butane, most preferably 1,2-dichloroethane.

The metallocene compound may be selected from the neutral metallocene compound of the formula $(Y)_a(Y')_bMX_x$ Cp and Cp designate each an unsaturated hydrocarbon radical with a central atom M. The groups Cp' and Cp' can be obtained by a covalent bridge (bond).

M indicates the transition metal which are chosen from the groups IIIB, IVB, VB and VIB of the Periodic Table.

a, b and x designate the integral numbers such as a+b+x=m, x>0, and a and/or b not equal to zero.

m indicates the valency of the transition metal M

X designates a halogen selected from Cl, Br or I.

The groups Cp and Cp' each advantageously represents a mono or a polycyclic group substituted with 5 to 50 carbon atoms bond with a double conjugated bond such as cyclopentadienyl, indenyl, or a fluorenyl radical or a derivative substituted by this radical containing up to 10 atoms of carbon. It can also work with a radical derived from the elements chosen from the group VA of the Periodic Table, for example, N or P.

The transition metal is selected from scandium, titanium, zirconium, hafnium and vanadium. The zirconium is particularly very convenient.

The catalyst has the formula 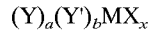
wherein X is selected from the group consisting of Cl, Br, I, preferably Cl.

ED is an electron donor compound,

M indicates the transition metal which are chosen from the groups IIIB, IVB, VB, VIB of the Periodic Table a is 1 to 30, preferably 2 to 3.5 b is 2 to 80, preferably 1.5 to 3 c is 0.001 to 0.1 d is 0.002 to 0.2

Cp=Cyclopentadienyl

The preferred catalyst is $MgCl_{2.1}$ $THF_{2.01}Zr_{0.017}Cp_{0.034}$ wherein THF=tetrahydrofuran The catalyst consists of particles which have a surface area of about 10 to 70 $m^2/g$, preferably of about 15 to 30 $m^2/g$.

In the present invention, the zirconium metallocene is present in the solid catalyst with a Zr/Mg molar ratio preferably ranging from 0.001 to 0.1, especially from 0.01 to 0.05. The compound used to form the high activity solid catalyst used in the present invention comprises at least one metallocene compound, at least magnesium metal, at least one organic dihalogen compound and at least an electron donor compound.

The preferred aliphatic hydrocarbon may be chosen from a group containing $C_6$ to $C_8$ carbon atoms. Precipitation reaction should occur extremely slowly over a period of 4 to 50 h and at a relatively low temperature from 0 to 50° C., preferably 15 to 30° C.

In another embodiment various reactants used for the preparation of the support (A) may be used with a molar ratio of dichloroethane/Mg in the range of 2 to 8, preferably of 3 to 6; and a molar ratio of electron donor/Mg in the range of 5 to 80, preferably of 15 to 40.

In a feature of the present invention, the Electron Donor compound (ED) must be free from labile hydrogen and cannot be chosen from for example, water, alcohols, or phenols. The ED must have an ability to complex magnesium dichloride.

In yet another feature of the present invention the organic electron donor compound, ED, is advantageously distributed homogeneously throughout the support particles, forming a homogeneous composition of magnesium dichloride and compound ED. Consequently, a support of this kind cannot be generally be prepared merely by bringing anhydrous magnesium dichloride particles into contact with the compound ED. For this reason it is recommended that the support can be prepared by precipitation of magnesium dichloride in the presence of the compound ED.

The essential characteristics of a solid catalyst is the halide state of neutral metallocene containing at least one cyclopentadienyl ligand in the backbone moiety making a part of the solid catalyst.

The solid support of the present invention may be prepared by reacting magnesium metals with a dihalo alkane compounds, especially dichloro alkane compounds. In this case, the presence of electron donor compounds, ED, acting as a complexing agent and not as a reactant, is necessary for the preparation of the particular support (A).

In yet another feature of the present invention, it is preferred to employ as electron donor compound, ED, of formula $R^1OR^2$ in which $R^1$ and $R^2$ are identical or different alkyl radicals especially containing 1 to 12 carbon atoms. The most preferred electron donor is selected from cyclic ethers compounds of which tetrahydrofuran is the most preferred. The various reactants used for the preparation of the support (A) can be used with a molar ratio of dichloroethane/Mg in the range of 2 to 8, preferably of 3 to 6; and a molar ratio of electron donor/Mg is in the range of 5 to 80, preferably of 15 to 40.

In one more feature of the present invention, the reaction between magnesium and dichloro alkane in the presence of the electron donor compound, ED, where all the reactant products are soluble in electron donor. The reaction can be conducted at a temperature of about 0 to 50° C.

Yet another feature of the present invention is to prepare an excellent support, in particular, one with a large quantity of electron donor compound is recommended, to perform the reaction at a low temperature ranging from 0 to 50° C., preferably, from 15 to 30° C. The reaction should proceed very slowly over a period of at least ¼ to 4 h., preferably from ½ to 2 h, so as to allow the reaction to occur completely. A large quantity of electron donor compound is always preferred, so that all the components are soluble in it. It is also advisable to carry out the reaction in anhydrous and inert conditions, for example, under nitrogen or argon atmosphere. The zirconium metallocene (B) is preferably used for the preparation of the solid catalyst in this present invention, which is in the form of a solution in the same electron donor compound. The solution concentration is in the range of 1 to 55 millimoles of zirconium per liter.

The solid support (A) which is present in the solution of electron donor, ED, may be brought in contact with zirconium metallocene in various ways. It is possible, to add the zirconium metallocene (B) solution to the support (A) solution or reversely. Addition should be done very slowly over a period of ¼ h to 4 h, preferably ½ h to 2 h, at a relatively low temperature from 0 to 50° C., preferably from 15 to 30° C. The solid catalyst present in solution can be precipitated in an saturated aliphatic hydrocarbon medium where all the components of the solid catalyst will precipitate completely or partially.

Yet another feature of the present invention is that the quantities of the components used for preparing the solid catalyst may be such that
 a) the molar ratio of Zr to Mg in the solid catalyst is in the range of 2 to 8, preferably 0.01 to 0.05
 b) the molar ratio of dichloroalkane to Mg is in the range of 2 to 8, preferably of 3 to 6.
 c) the molar ratio of electron donor, ED, to Mg is in the range of 5 to 80, preferably 15 to 40.

In a yet another feature of the present invention the catalyst is obtained in the form of a solid which can be isolated by removing the hydrocarbon solvent employed during the course of catalyst preparation. The solvent may, for example, be evaporated off at atmospheric pressure or at a lower pressure. The solid catalyst may also washed with liquid hydrocarbon, preferably a saturated aliphatic hydrocarbon such as n-hexane or n- heptane. Modification of the support in this manner provides the catalyst composition with increased activity.

In the solid catalyst, the magnesium halide, preferably chloride such as dichloride support contains a relatively large amount of an electron donor compound, ED. The support comprises magnesium dichloride and compound ED in molar percentages of about 25 to 50 mol %, preferably, of about 30 to 45 mol % and especially, of about 32 to 40 mol % of magnesium dichloride; and from 40 to 80 mol %, preferably, from 45 to 75 mol % and especially, from 50 to 70 mol % of the compound ED. The electron donor compound should be an organic compound which is liquid at 25° C. and in which the metallocene and the magnesium dichloride compound formed during the course of reaction are partially or completely soluble.

The process of the present invention is described herein below with examples which are illustrative only and should not be construed to limit the scope of the present invention in any manner.

EXAMPLE 1

These examples illustrate the preparation of the catalyst precursor

All glass equipments were heated in vacuo and flushed with nitrogen. All manipulations involving air-sensitive compounds were performed inside a Labconco Model 50004 inert atmosphere glove box continuously purged with high purity $N_2$ from a generator (Spantech Model NG 300-1) or under a positive pressure of high purity $N_2$ using standard bench top inert atmosphere techniques. The solvent n-hexane, xylene and electron donor(tetrahydrofuran) used in each case freshly distilled over sodium under $N_2$. Magnesium was estimated titrimetrically using EDTA. Chlorine was estimated by argentometric method. The amount of zirconium in the catalyst was determined by using Inductively Coupled Plasma taking zirconium atomic absorbtion standard solution.

EXAMPLE 2

In a three neck round bottom flask equipped with magnetic needle, reflux condensor, $N_2$ inlet and outlet which was previously flame dried under vacuum and cooled under $N_2$ atmosphere. 0.30 g of magnesium turnings (corresponding to 0.0125 mol of Mg) were taken inside the flask which was activated by iodine followed by addition of 40 mL of tetrahydrofuran and the slurry was stirred at a temperature of 25 to 30° C. for ½ h.

A mixture (10 mL) of 1,2-dichloroethane and tetrahydrofuran (1:1) was added to the slurry by means of a syringe over a period of ½ h. It was observed that all the magnesium turnings were slowly dissolved in tetrahydrofuran with the formation of a clear solution. Steady evolution of ethylene gas was also observed indicating the decomposition of the intermediate chloroethyl magnesium complex with the subsequent formation of magnesium dichloride tetrahydrofuran complex and its dissolution into tetrahydrofuran (THF).

In another round bottom flask 0.31 g of bis (cyclopentadienyl)zirconium dichloride (corresponding to $1.06 \times 10^{-3}$ mol as Zr) was dissolved in 20 mL of tetrahydrofuran and the solution was added to the previous solution over a period of ½ h at a temperature of about 25 to 30° C. with constant stirring. The whole solution was then transferred into 500 mL round bottom flask containing 300 mL of n-hexane. The white solid precipitates out which was washed three to four times by n-hexane using 50 mL each time. Finally, it was dried under vacuum and used as such for polymerization.

The solid catalyst thus prepared, containing 0.65 wt % of Zr, 10 wt % of Mg and 65 wt % of THF respectively and a surface area of 18.5 $m^2/g$.

EXAMPLE 3

In a three neck round bottom flask equipped with magnetic needle, reflux condensor, $N_2$ inlet and outlet which was previously flame dried under vacuum and cooled under $N_2$ atmosphere. 0.215 g of Mg turnings (corresponds to 0.01 mol of Mg) were taken inside the flask which was activated by iodine followed by addition of 40 mL of tetrahydrofuran and the slurry was stirred at a temperature of 25 to 30° C. for ½ h.

A mixture (10 mL) of 1,2-dichloroethane and tetrahydrofuran (1:1) was added to the slurry by means of a syringe over a period of ½ h. It was observed that all the magnesium turnings were slowly dissolved in tetrahydrofuran with the formation of a clear solution. Steady evolution of ethylene gas was also observed indicating the decomposition of the intermediate chloroethyl magnesium complex with the subsequent formation of magnesium dichloride tetrahydrofuran complex and its dissolution into tetrahydrofuran.

In another round bottom flask 0.243 g of bis (cyclopentadienyl)zirconium dichloride (corresponding to $8.31 \times 10^{-4}$ mol as Zr) was dissolved in 15 mL of tetrahydrofuran and the solution was added to the previous solution over a period of ½ h at a temperature of about 30° C. with constant stirring. The whole solution was then transferred into 500 mL round bottom flask containing 250 mL of n-hexane. The white solid precipitates out which was washed three to four times by n- hexane using 50 mL each time. Finally, it was dried under vacuum and used as such for polymerization.

The solid catalyst thus prepared, containing 0.0.33 wt % of Zr, 11.1 wt % of Mg and 63.1 wt % of THF (tetrahydrofuran).

EXAMPLE 4

In a three neck round bottom flask equipped with magnetic needle, reflux condensor, $N_2$ inlet and outlet which was previously flame dried under vacuum and cooled under $N_2$ atmosphere. 0.40 g (corresponding to 0.0164 mol of Mg) were taken inside the flask which was activated by iodine followed by addition of 60 mL of tetrahydrofuran and the slurry was stirred at a temperature of 25 to 35° C. for ½ h.

A mixture (20 mL) of 1,2-dichloroethane and tetrahydrofuran (1:2) was added to the slurry by means of a syringe over a period of ½ h. It was observed that all the magnesium turnings were slowly dissolved in tetrahydrofuran with the formation of a clear solution. Steady evolution of ethylene gas was also observed indicating the decomposition of the intermediate chloroethyl magnesium complex with the subsequent formation of magnesium dichloride tetrahydrofuran complex and its dissolution into tetrahydrofuran.

In another round bottom flask 0.42 g of bis (cyclopentadienyl)zirconium dichloride (corresponding to $1.43 \times 10^{-3}$ mol as Zr) was dissolved in 20 mL of tetrahydrofuran and the solution was added to the previous solution over a period of ½ h at a temperature of about 25 to 35° C. with constant stirring. The whole solution was then transferred into 500 mL round bottom flask containing 300 mL of n-hexane. The white solid precipitates out which was washed three to four times by n- hexane using 50 mL each time. Finally, it was dried under vacuum and used as such for polymerization.

The solid catalyst thus prepared, containing 0.71 wt % of Zr, 9.40 wt % of Mg and 67 wt % of THF (tetrahydrofuran)

EXAMPLE 5

In a three neck round bottom flask equipped with magnetic needle, reflux condensor, $N_2$ inlet and outlet which was previously flame dried under vacuum and cooled under $N_2$ atmosphere. 0.40 g (corresponding to 0.0165 mol of Mg) were taken inside the flask which was activated by iodine followed by addition of 50 mL of tetrahydrofuran and the slurry was stirred at a temperature of 25 to 30° C. for ½ h.

A mixture (20 mL) of 1,2-dichloroethane and tetrahydrofuran (1:2) was added to the slurry by means of a syringe over a period of ½ h. It was observed that all the magnesium turnings were slowly dissolved in tetrahydrofuran with the formation of a clear solution. Steady evolution of ethylene gas was also observed indicating the decomposition of the intermediate chloroethyl magnesium complex with the subsequent formation of magnesium dichloride tetrahydrofuran complex and its dissolution into tetrahydrofuran.

The clear solution obtained from the previous experiment was then transferred to a round bottom flask containing 400 mL of n-hexane when a white solid separated out. The solid was washed three times by n-hexane. Finally it was dried under vacuum.

To this solid 60 mL of xylene was added and the mixture was stirred under $N_2$ at a temperature of 70° C. To this mixture 0.42 g of bis(cyclopentadienyl)zirconium dichloride previously dissolved in 40 mL of xylene was added over a period of 15 minutes and the whole slurry was stirred for 5 h maintaining the temperature at 70° C. Finally it was cooled under $N_2$ and to this 400 mL of n-hexane was added. The white solid obtained was washed three to four times by n-hexane using 50 mL each time. Finally, it was dried under vacuum and used as such for polymerization.

The solid catalyst thus prepared, containing 1.67 wt % of Zr, 9 wt % of Mg and 61 wt of THF.

EXAMPLE 6

In a three neck round bottom flask equipped with magnetic needle, reflux condenser, $N_2$ inlet and outlet which was previously flame dried under vacuum and cooled under $N_2$ atmosphere. 0.40 g (corresponding to 0.0164 mol of Mg) were taken inside the flask which was activated by iodine followed by addition of 40 mL of tetrahydrofuran and the slurry was stirred at a temperature of 25 to 30° C. for ½ h.

A mixture (10 mL) of 1,2-dichloroethane and tetrahydrofuran (1:1) was added to the slurry by means of a syringe over a period of ½ h. It was observed that all the magnesium turnings were slowly dissolved in tetrahydrofuran with the formation of a clear solution. Steady evolution of ethylene gas was also observed indicating the decomposition of the intermediate chloroethyl magnesium complex with the subsequent formation of magnesium dichloride tetrahydrofuran complex and its dissolution into tetrahydrofuran.

In another round bottom flask 0.50 g of bis(cyclopentadienyl)zirconium dichloride (correspond to $1.71 \times 10^{-3}$ mol as Zr) was dissolved in 30 mL of tetrahydrofuran and the solution was added to the previous solution over a period of ½ h at a temperature of about 50° C. with constant stifling. The whole solution was then transferred into 500 mL round bottom flask containing 300 mL of n-hexane. The white solid precipitates out which was washed three to four times by n-hexane using 50 mL each time. Finally it was dried under vacuum and used as such for polymerization.

The solid catalyst thus prepared, containing 0.58 wt % of Zr, 10 wt % of Mg and 65 wt % of THF.

EXAMPLE 7

In a three neck round bottom flask equipped with magnetic needle, reflux condenser, $N_2$ inlet and outlet which was previously flame dried under vacuum and cooled under $N_2$ atmosphere. 0.30 g (corresponding to 0.0164 mol of Mg) were taken inside the flask which was activated by iodine followed by addition of 40 mL of tetrahydrofuran and the slurry was stirred at a temperature of 25 to 30° C. for ½ h.

A mixture (10 mL) of 1,2-dichloroethane and tetrahydrofuran (1:1) was added to the slurry by means of a syringe over a period of ½ h. It was observed that all the magnesium turnings were slowly dissolved in tetrahydrofuran with the formation of a clear solution. Steady evolution of ethylene gas was also observed indicating the decomposition of the intermediate chloroethyl magnesium complex with the subsequent formation of magnesium dichloride tetrahydrofuran complex and its dissolution into tetrahydrofuran.

In another round bottom flask 0.31 g of bis(dienyl) zirconium dichloride (correspond to $1.06 \times 10^{-3}$ mol as Zr) was dissolved in 20 mL of tetrahydrofuran and the solution was added to the previous solution over a period of ½ h at a temperature of about 25 to 30° C. with constant stirring. The whole solution was then transferred into 500 mL round bottom flask containing 300 mL of n-hexane. The white solid precipitates out which was washed three to four times by n-hexane using 50 mL each time. Finally it was dried under vacuum and used as such for polymerization.

The solid catalyst thus prepared, containing 0.52 wt % of Zr, 10 wt % of Mg and 68 wt % of THF.

The catalyst prepared by the present invention confers an unusual benefits in terms of catalyst activity, increases molecular weight. The beneficial effect of the zirconium based metallocene catalyst supported on magnesium chloride is unexpected and unanticipated.

The process of the present invention is described herein below with examples which are illustrative only and should not be construed to limit the scope in any manner.

EXAMPLE-1

All glass equipments were heated in vacuo and flushed with nitrogen. All manipulations involving air-sensitive compounds were performed inside a Labconco Model 50004 inert atmosphere glove box continuously purged with high purity $N_2$ from a generator (Spantech Model NG 300-1) or under a positve pressure of high purity $N_2$ using standard bench top inert atmosphere techniques. The solvent used for polymerization such as xylene and n-heptane used in each case freshly distilled over sodium under $N_2$. The intrinsic viscosities of the polymers obtained from the present invention were determined in decalin as solvent at 135° C. using an Ubbelohde viscometer. MAO was added as a 5.4 wt. % (as Al) solution in toluene. The MAO (Witco Company) as obtained had a Me/Al ratio 1.7, free trimethylaluminum 31 wt % and Al content 10.9 wt % in toluene. Crystallinity of the copolymer was determined by differential Scanning Calorimetry (DSC). Polydispersities and the molecular weight distribution of the polymers were measured by GPC (Waters 150C ALC/GPC) at 135° C. in 1,2,4-trichlorobenzene. $\mu$-Styragel columns $10^5$, $10^4$, $10^3$, 500 Å were used and the peaks were calibrated using a standard polystyrene. A 0.3–0.4% w/v solution was used data flow rate of 1.0 mL/min.

EXAMPLE-2

Polymerization of ethylene was performed in a stirred glass cell at one atmosphere pressure using xylene as diluent. A gas burette with a reservoir containing silicone oil was used to feed ethylene continuously to the cell. The reaction cell was dried at 155° C. overnight and cooled under ethylene. 8.3 mg catalyst ($6.09 \times 10^{-7}$ mol as Zr) was tranferred into cell inside the glove-box. Xylene (50 mL) was introduced into the cell using a hypodermic syringe. Polymerization was initiated by the addition of MAO in toluene ($3.05 \times 10^{-4}$ mol as Al), keeping Al/Zr mole ratio 5000. The reaction temperature was maintained at 70° C. by circulating water from a thermostat through the jacket of the cell and the gas-burette. Ethylene uptake was measured as function of time. The reaction was terminated after ½ h by addition of acidified methanol. The polymer was filtered, washed with methanol and dried at 40° C. under vacuum.
Yield: 1.65 g
Activity: 59 Kg PE/g-Zr.h
Intrinsic viscosity: 1.35 dL/g; MWD: 2.43

EXAMPLE-3

Polymerization of ethylene was performed in a stirred glass cell at one atmosphere pressure using xylene as diluent. A gas burette with a reservoir containing silicone oil was used to feed ethylene continuously to the cell. The reaction cell was dried at 155° C. overnight and cooled under ethylene. 8.1 mg catalyst ($5.96 \times 10^{-7}$ mol as Zr) was transferred into the cell inside the glove-box. Xylene (50 mL, previously treated with trimethylaluminum) was introduced into the cell using a hypdermic syringe. Polymerization was initiated by the addition of MAO in toluene ($3.0 \times 10^-$ mol as Al), keeping Al/Zr mol ratio 5000. The reaction temperature was maintained at 70° C. by circulating water from a thermostat through the jacket of the cell and the gas-burette. Ethylene uptake was measured as a function of time. The reaction was terminated after ½h by addition of acidified methanol. The polymer was filtered, washed with methanol and dried at 40° C. under vaccum.

Yeild: 2.4 g

Activity: 88 Kg PE/g-Zr.h

Intrinsic viscosity: 1.25 d/Lg; MWD: 2.51

We claim:

1. A process for the preparation of a solid magnesium halide supported metallocene catalyst having a transition metal selected from the group consisting of IIIB, IVB, VB and VIB of the periodic table, which comprises preparing a slurry of magnesium metal in an electron donor solvent; heating the slurry of magnesium metal to 0° C. to 50° C. for a period of 10 minutes to 4 hr.; adding a dihaloalkane compound to said slurry to obtain a homogeneous solution of a support (solution A); separately preparing a solution of a metallocene compound in the same electron donor solvent as solution A (solution B); heating the solution B to 0° C. to 50° C. for a period ranging between 10 minutes and 1 hr., adding solution B to solution A over a period ranging between 10 minutes to 2 hrs. while maintaining the temperature in the range of 0 to 50° C. to obtain a homogeneous solution; cooling the resultant homogeneous solution to room temperature under an inert atmosphere; pouring the reaction mixture into a liquid hydrocarbon medium in which all the components will be partly or completely insoluble to precipitate the solid catalyst; separating the solid catalyst precipitated, washing the solid catalyst with a hydrocarbon solvent; and drying the solid catalyst under vacuum at a temperature ranging between 0 to 50° C.

2. The process as claimed in claim 1, wherein the halide in said magnesium halide is selected from the group consisting of chloride, bromide and iodide.

3. The process as claimed in claim 1, wherein the electron donor solvent is a Lewis base.

4. The process as claimed in claim 1, wherein the electron donor solvent is selected from the group consisting of an alkyl ester of a $C_1$ to $C_4$ saturated aliphatic carboxylic acid; an alkyl ester of a $C_7$ to $C_8$ aromatic carboxylic acid; a $C_2$ to $C_6$ aliphatic ether; a $C_3$ to $C_4$ cyclic ether and a $C_4$ mono or di ether.

5. The process as claimed in claim 1, wherein the dihaloalkane compound is selected from the group consisting of dichloro substituted methane, ethane, propane and butane.

6. The process as claimed in claim 1, wherein the metallocene compound is a neutral metallocene compound of the formula (Cp)$_a$(Cp)'$_b$MX$_x$, wherein Cp and Cp' each represent cyclopentadienyl, fluorenyl, indenyl, or a substituted derivative thereof; M indicates a transition metal selected from the groups IIIB, IVB, VB and VIB of the Periodic Table;

a, b and x designate the integral numbers such as a+b+x=m, x>0, and a, b or a plus b are not equal to zero;

m indicates the valency of the transition metal M; and

X designates a halogen selected from the group consisting of Cl, Br and I.

7. The process as claimed in claim 6, wherein said cyclopentadienyl, fluorenyl, indenyl, or substituted derivatives thereof are optionally substituted with a radical derived from an element selected from the group VA of the Periodic Table.

8. The process as claimed in claim 1, wherein the transition metal is selected from the group consisting of scandium, titanium, zirconium, hafnium and vanadium.

9. The process as claimed in claim 1, wherein the catalyst has the formula MgX$_a$(ED)$_b$.M$_c$Cp$_d$ wherein X is selected from the group consisting of Cl, Br and I, ED is an electron donor compound, M is a transition metal selected from the groups consisting of III B, IV B, VB, and VIB of the Periodic Table, a is 1 to 30 b is 1.5 to 80 c is 0.001 to 0.1 and d is 0.002 to 0.2; and

Cp is cyclopentadienyl.

10. The process as claimed in claim 1, wherein the support contains from 25 to 50 mol % of magnesium halide, and from 40 to 80 mol %, of an electron donor compound.

11. The process as claimed in claim 1, wherein the catalyst consists of particles which have a surface area of about 10 to 70 m$^2$/g.

12. The process as claimed in claim 1, wherein said metallocene compound is a zirconium metallocene.

13. The process as claimed in claim 1, wherein dichloroethane and Mg are used for the preparation of the solution (A) in a molar ratio of dichloroethane/Mg of 2 to 8, and a molar ratio of electron donor solvent/Mg of 5 to 80.

14. The process as claimed in claim 9, wherein b is 1.5 to 3.

15. The process as claimed in claim 1, wherein said hydrocarbon solvent has $C_6$ to $C_8$ carbon atoms.

16. The process as claimed in claim 1, wherein the precipitation reaction occurs over a period of 4 to 50 h and at a temperature from 0 to 50° C.

17. The process as claimed in claim 2, wherein said magnesium halide is magnesium chloride.

18. The process as claimed in claim 3, wherein said Lewis base is an ether, thioether, ester, sulphone, sulphoxide, secondary amine, tertiary amine, tertiary phosphine or phosphoramide.

19. The process as claimed in claim 3, wherein said electron donor solvent is a electron donor compound, a cyclic or a noncyclic ether, an alkyl ester of an aliphatic or aromatic carboxylic acid, or an aliphatic ketone.

20. The process as claimed in claim 4, wherein said electron donor solvent is a $C_3$ to $C_4$ aliphatic ether.

21. The process as claimed in claim 4, wherein said electron donor solvent is a $C_4$ mono- or di- ether.

22. The process as claimed in claim 5, wherein said dihaloalkane is 1,2-dichloroethane.

23. The process as claimed in claim 7, wherein said Cp and Cp' is a cyclopentadienyl, indenyl or a fluorenyl radical or a substituted derivative thereof containing up to 10 carbon atoms.

24. The process as claimed in claim 8, wherein said transition metal is zirconium.

25. The process as claimed in claim 9, wherein X is chlorine.

26. The process as claimed in claim 10, wherein said magnesium halide is magnesium dichloride and wherein the support contains magnesium dichloride in an amount of from 30 to 45 mol %.

27. The process as claimed in claim 26, wherein the said magnesium dichloride is present in an amount of from 32 to 40 mol %.

28. The process as claimed in claim 10, wherein the support contains said electron donor compound in an amount of from 45 to 75 mol %.

29. The process as claimed in claim 28, wherein said electron donor compound is present in an amount of from 50 to 70 mol %.

30. The process as claimed in claim 11, wherein said particles have a surface area of about 15 to 30 $m^2/g$.

31. The process as claimed in claim 12, wherein the Zr/Mg molar ratio is from 0.01 to 0.05.

32. The process as claimed in claim 16, wherein the temperature for the precipitation reaction is from 15 to 30° C.

33. The process as claimed in claim 9, wherein a is 2 to 3.5.

* * * * *